April 21, 1959 P. V. McKINNEY 2,883,344
FOAM DETECTION AND CONTROL
Filed April 11, 1956
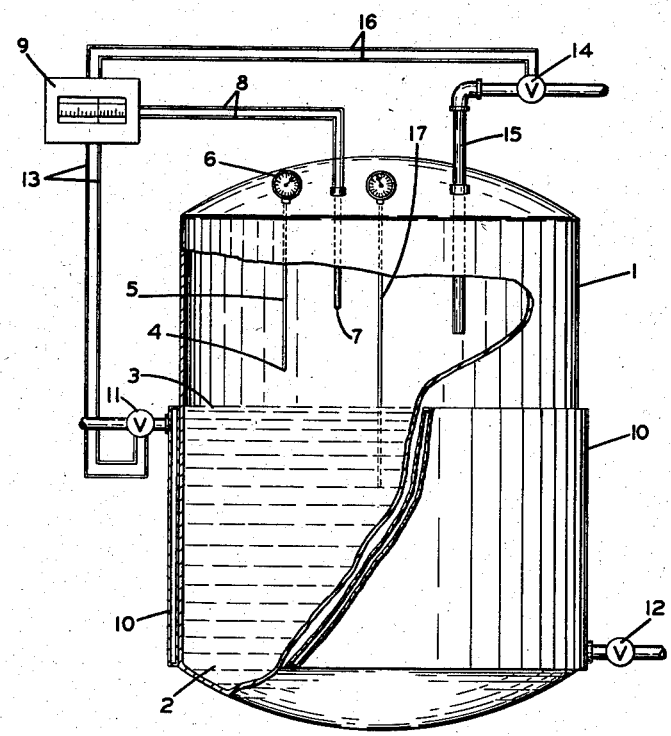
INVENTOR
PAUL V. McKINNEY
ATTORNEY United States Patent Office 2,883,344
Patented Apr. 21, 1959

2,883,344

FOAM DETECTION AND CONTROL

Paul V. McKinney, Princeton, N.J., assignor to Armstrong Cork Company, Lancaster, Pa., a corporation of Pennsylvania Application April 11, 1956, Serial No. 577,519

4 Claims. (Cl. 252—321)

This invention relates to a method of detecting and controlling the appearance of foam on the surface of liquid in a vessel. It also relates to apparatus for controlling such foam.

Modern technology requires the carrying out of many processes in a closed system. Such processes as neutralization or condensation reactions are accomplished inside a reactor or similar vessel. These vessels may be equipped with the usual accessories for carrying out the desired reaction. Examples of such accessories are reflux condensers, vapor lines, feed inlets, outlets, agitators, and various control devices such as temperature and pressure recording instruments.

Many of these processes are productive of an undesirable foam at one or more phases of the process. Such foam is always a nuisance and often a hazard in the process; foam formation may flood reflux condensers or vapor ducts, corrode explosion discs, and bring about undesirable losses in the material under treatment.

To overcome foaming, antifoaming agents are frequently used. Additionally, many reactors or vessels are equipped with a glass port through which an operator may visually inspect the surface of the liquid under treatment to determine the appearance of foam.

Although antifoaming agents are often useful, sometimes they interfere with the course of reaction and other times they are not as effective as they might be. The use of a visual port may confine the movement of an operator and in any case may not allow visual inspection of the liquid surface; the formation of steam or other visible vapors in the vessel or the clouding of the interior surface of the port may render it impossible to inspect the liquid surface.

Accordingly, there is a need for trouble-free methods and apparatus for the detection and control of foam appearance on a liquid surface in a closed system.

It is the primary object of the present invention to supply this need.

To this end, the invention contemplates measuring the temperature of at least one position above the surface of a liquid undergoing treatment. The temperature at this position is measured in the absence of foam on the liquid surface. Subsequently, a determination of a change in that temperature not caused by a temperature change in the liquid undergoing treatment will indicate the appearance of foam on the surface of the liquid. This will be true so long as the liquid is at a temperature other than ambient temperature. The change in temperature can be used to control the amount of material being introduced into the vessel, which will in turn control the formation of the foam.

The most usual temperature-indicating device used in one embodiment of the present invention will simply be a thermometer. Preferably the thermometer will have a long stem, the sensitive end of which protrudes into the vessel and the dial of which may be easily read on the vessel's exterior. Such a thermometer may be installed vertically or horizontally. The temperature-sensitive element of the thermometer may be in a position from a few inches to several feet above the surface of the liquid, depending on the ease with which the liquid foams. Generally speaking, with large vessels it is preferred that the temperature-sensitive element be positioned at least about one foot above the surface of the liquid in order that the formation of trifling amounts of foam will not contact the end of the thermometer. Additionally, ample leeway is advantageous in that the level of the liquid surface in the vessel need not be so carefully controlled. Such a thermometer would be in addition to a thermometer used to measure the temperature of a liquid undergoing treatment inside the vessel.

A thermocouple may be used instead of a thermometer. The junction of a thermocouple may be disposed above the surface of the liquid in the same manner as the temperature-sensitive end of a thermometer. The junction may be in open contact with the vapors in the vessel, or it may be disposed inside a thermocouple well. It is common practice to add oil to a thermocouple well to aid in the transference of heat to the junction. Thermometers too may be utilized in a thermocouple well. It must be recognized, however, that the use of thermocouple wells will increase the time lag betwen the actual temperature change at the position inside the vessel and the change as indicated on the temperature-indicating device. Where thermocouples are used, means for connecting the thermocouple junction to a temperature-measuring device will be used in accordance with known technics; thermocouple leads will be used.

Where the liquid under treatment is at a temperature above ambient temperature, the appearance of foam on the surface diminishes the heat radiated from the liquid surface to the temperature-sensitive element positioned above the surface. Thus, the appearance of foam on the surface of such a liquid will be indicated by a sharp drop in temperature on a temperature-indicating device. Where the temperature of the liquid under treatment is below ambient temperature, the appearance of foam again diminishes the radiation, this time from the temperature-sensitive element of the colder liquid surface, and such appearance will be indicated by a rise in temperature at the temperature-indicating device. Thus, in one embodiment, the method of the present invention is useful in detecting the appearance of foam on a liquid surface that is maintained at a temperature either higher or lower than ambient temperature. As a practical matter, however, the method is most useful in detecting the appearance of foam on the surface of liquids maintained at elevated temperatures.

More than one temperature-sensitive element may be positioned above the surface of the liquid. If one of the temperature-sensitive elements is positioned close to the surface of the liquid, the temperature-indicating device will show a drop in temperature as the foam first appears, followed by a rise in temperature as the foam comes in contact with the temperature-sensitive element. A second temperature-sensitive element positioned higher than the first temperature-sensitive element will show a consistent drop in temperature until the foam level reaches it. Thus, a series of temperature-sensitive elements positioned at different levels throughout the vessel will not only indicate the appearance of foam but will also serve to tell what level the foam occupies at any particular time. This information will follow from a knowledge of the precise position of the temperature-sensitive elements of the various thermometers, thermocouples, or thermometers and thermocouples. Use of the present invention to control the foam will be described below.

The accompanying drawing is a simplified diagrammatic representation of the means by which the present invention may be practiced.

A vessel 1 contains a liquid 2 having a liquid surface 3. The sensitive element 4 of a thermometer 5 having a dial or scale 6 for reading the temperature protrudes into the vessel 1 above the liquid surface 3. A thermocouple well 7 may also protrude into the vessel 1. The junction of the thermocouple will be at the bottom of the thermocouple well 7, and the thermocouple leads 8 enter a temperature-recording or controlling device 9. The vessel 1 may be equipped with an agitator, vapor ducts, reflux condenser, total condenser, cooling coils, and any other accessories, none of which are shown.

The appearance of foam on the liquid surface 3 acts as a radiation shield between the heat contained in liquid 2 and the temperature-sensitive element 4 and the bottom of the thermocouple well 7. Thus, if the liquid 2 is at a temperature higher than ambient temperature, the temperature reading on the dial 6 or the temperature-recording device 9 will show a dramatic drop. Should the temperature of the liquid 2 be lower than ambient temperature, then the temperature as read on the dial 6 or the temperature-recording device 9 will show a rise.

Reference to the drawing will show how it is possible to determine the level of the foam inside the vessel 1. When foam first appears at the liquid surface 3, the temperature as measured at sensitive element 4 and the bottom of thermocouple well 7 will drop. As the foam level rises, it will eventually come in physical contact with sensitive element 4. At this point, the dial 6 will show an increase in temperature, while the temperature as measured at the bottom of thermocouple well 7 will continue to show the same reduced temperature. Therefore, it will be apparent that the level of foam in the vessel 1 lies between the level defined by the position of sensitive element 4 and the bottom of thermocouple well 7. As mentioned previously, a series of three or more positions may be utilized to show the height of the foam in the vessel.

The drawing also indicates how it is possible for the apparatus of the present invention to be utilized in controlling foam inside the vessel 1. Where the vessel possesses a jacket 10 and a steam inlet valve 11 to the jacket 10, the temperature-measuring and/or controlling device 9 may be used to regulate steam or other heat-yielding material led into jacket 10 through the valve 11. A drop in temperature as measured at the bottom of thermocouple well 7 can be utilized by the temperature-measuring and/or controlling device 9 to close or shut off valve 11, thus diminishing or stopping the flow of steam or other material in heat exchange relationship with the liquid in the vessel. When the foam on the surface 3 subsides, the temperature as measured at thermocouple well 7 will rise, and this rise may be utilized by the temperature-measuring and/or controlling device 9 to reopen valve 11 and readmit steam to the jacket 10. The effect of this arrangement is that the heat supply to the liquid 2 is automatically cut off whenever foam appears on the surface 3. The valve 11 may be any of those valves well-known in the art which can be made responsive to temperature change. Valve 12 serves as the outlet of the jacket 10 where steam is used to heat the liquid 2. In any case, the leads 13 connect the temperature-measuring and/or controlling device 9 with controllable valves 11 and 12. Should it be necessary or desirable to heat the liquid 2 by means of hot water, then valve 12 will serve as the hot water inlet and valve 11 will serve as the hot water outlet. Under these conditions, the temperature-measuring device 9 would actuate valve 12 in order to control the rate of heat supplied to the liquid 2. Alternatively, the flow of cooling water into the jacket 10 through valve 12 may be accomplished. A similar system may be used to control flow in cooling coils, not shown.

Where a reactant is being added to the liquid 2, the apparatus of the present invention will serve to control the appearancse of foam caused by the addition of the reactant. A controlling valve 14 may be installed in reactant inlet 15. The temperature-measuring device 9 controls the valve 14 by means of the leads 16, so as to close valve 14 whenever the temperature drops, as measured by the thermocouple located in the thermocouple well 7. The effect of this arrangement is to diminish the input of a reactant or other material whenever such input brings about the appearance of foam on the surface 3. Although the inlet 15 is shown entering through the top of the vessel 1, it is recognized that it may enter the vessel 1 at any convenient place and may introduce the reactant or other material below the surface 3 of the liquid 2.

The present invention contemplates the simultaneous control of both the reactant input as through inlet 15 and the heat input by means of the jacket 10. In some cases, it may be desirable to have more than one temperature-measuring and/or controlling device 9 or more than one inlet 15, each with its controlling valve 14 or with a common controlling valve. Thus, one embodiment of the present invention contemplates control of the rate of introduction of material into a vessel whether the material is a reactant, or a source of heat, or a means of cooling, or combinations thereof. Such material may be introduced into the interior of the vessel proper, or into a heating jacket or cooling coils mounted on or in the vessel; all these conditions are contemplated when mention is made therein of introducing material into the vessel.

Under certain conditions, it may be preferred to control the controllable valves by means of a change in the difference in temperature between element 4 and the temperature of liquid 2 as measured, for example, by thermometer 17. Again, thermometers may be replaced by thermocouples and the positions may be varied within the limits stated.

I claim:

1. The method of detecting the appearance of foam on the surface of liquid in a vessel at a temperature other than ambient temperature, which method comprises measuring the temperature of at least one position in said vessel above the surface of said liquid in the absence of foam on said liquid surface and determining a change in said temperature not caused by a temperature change in said liquid, which change in temperature indicates the appearance of foam on said liquid surface.

2. The method according to claim 1 wherein the temperature is measured in a plurality of positions above the surface of said liquid.

3. The method of detecting the appearance of foam on the surface of liquid in a vessel at a temperature higher than ambient temperature, which method comprises disposing at least one temperature-sensitive element of a temperature-measuring device in a position in said vessel above the surface of said liquid, measuring the temperature at said position in the absence of foam on said liquid surface, and determining a decrease in said temperature not caused by a temperature decrease in said liquid, which decrease in temperature indicates the appearance of foam on said liquid surface.

4. The method of controlling the formation of foam on the surface of liquid in a vessel at a temperature other than ambient temperature, which method comprises measuring the temperature of at least one position above the surface of said liquid in the absence of foam on said liquid surface, determining a change in said temperature not caused by a temperature change in said liquid, and controlling the rate of a material to be introduced into said vessel in accordance with said temperature change, whereby foam formation on said liquid surface is retarded.

(References on following page)

References Cited in the file of this patent

UNITED STATES PATENTS

| | | | |
|---|---|---|---|
| 1,496,431 | Rhodes et al. | June 3, | 1924 |
| 1,916,614 | Harrison | July 4, | 1933 |
| 1,921,725 | Boutet | Aug. 8, | 1933 |
| 1,984,789 | Everett | Dec. 18, | 1934 |
| 2,017,368 | Magner | Oct. 15, | 1935 |
| 2,413,128 | Wills | Dec. 24, | 1946 |
| 2,437,704 | Moncrieff et al. | Mar. 16, | 1948 |
| 2,570,451 | Hottenroth | Oct. 9, | 1951 |
| 2,667,178 | Fred et al. | Jan. 26, | 1954 |

FOREIGN PATENTS

| | | | |
|---|---|---|---|
| 987,520 | France | Apr. 18, | 1951 |
| 1,004,181 | France | Nov. 28, | 1951 |